United States Patent
Jang et al.

(10) Patent No.: US 9,888,514 B2
(45) Date of Patent: *Feb. 6, 2018

(54) RANDOM ACCESS METHOD AND APPARATUS FOR USE IN WIRELESS COMMUNICATION SYSTEM SUPPORTING DUAL CONNECTIVITY

(71) Applicant: Samsung Electronics Co., Ltd., Suwon-si, Gyeonggi-do (KR)

(72) Inventors: Jaehyuk Jang, Suwon-si (KR); Soenghun Kim, Suwon-si (KR); Gert-Jan Van Lieshout, Apeldoorn (NL); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,314

(22) Filed: Oct. 7, 2015

(65) Prior Publication Data

US 2016/0029425 A1    Jan. 28, 2016

Related U.S. Application Data

(63) Continuation of application No. 14/661,459, filed on Mar. 18, 2015.

(30) Foreign Application Priority Data

Mar. 21, 2014    (KR) .................. 10-2014-0033497

(51) Int. Cl.
*H04W 76/02* (2009.01)
*H04W 52/30* (2009.01)
(Continued)

(52) U.S. Cl.
CPC ....... *H04W 76/025* (2013.01); *H04W 52/146* (2013.01); *H04W 52/30* (2013.01);
(Continued)

(58) Field of Classification Search
CPC ... H04W 52/30; H04W 52/24; H04W 52/244; H04W 52/34; H04W 88/06; H04W 74/00;
(Continued)

(56) References Cited

U.S. PATENT DOCUMENTS 6,400,695 B1 * 6/2002 Chuah ............... H04W 74/0875
370/310
8,526,389 B2 * 9/2013 Dinan ................. H04W 52/281
370/329

(Continued)

FOREIGN PATENT DOCUMENTS

EP          3073649 A1    9/2016
KR    10-2013-0115621 A  10/2013

OTHER PUBLICATIONS

"Uplink Transmission Power Management and PHR Reporting for Dual Connectivity," 3GPP TSG RAN WG2 Meeting #84, R2-133945, Nov. 11, 2013.

(Continued)

*Primary Examiner* — Warner Wong
(74) *Attorney, Agent, or Firm* — Jefferson IP Law, LLP

(57) ABSTRACT

A random access method and an apparatus of a terminal for performing random access procedure to multiple base stations in parallel in a Long Term Evolution (LTE) system supporting dual connectivity are provided. The method includes determining whether a first preamble transmission to a first cell of a first base station is overlapped with a second preamble transmission to a second cell of a second base station in a time domain, determining, when the first preamble transmission is overlapped with the second pre- (Continued)

amble transmission in the time domain, whether a sum of transmit powers calculated for the first and second preamble transmissions is greater than a maximum allowed transmit power of the terminal, and controlling, when the sum of the first and second preamble transmit powers is greater than the maximum allowed transmit power, the transmit power calculated for the second preamble transmission.

8 Claims, 12 Drawing Sheets

(51) Int. Cl.
*H04W 52/36* (2009.01)
*H04W 74/08* (2009.01)
*H04W 52/14* (2009.01)
*H04W 52/50* (2009.01)
H04W 52/24 (2009.01)
H04W 52/48 (2009.01)
H04L 5/00 (2006.01)
H04W 52/34 (2009.01)
H04W 52/40 (2009.01)

(52) U.S. Cl.
CPC ......... *H04W 52/36* (2013.01); *H04W 52/367* (2013.01); *H04W 52/50* (2013.01); *H04W 74/0833* (2013.01); *H04L 5/001* (2013.01); *H04W 52/244* (2013.01); *H04W 52/34* (2013.01); *H04W 52/346* (2013.01); *H04W 52/365* (2013.01); *H04W 52/40* (2013.01); *H04W 52/48* (2013.01)

(58) Field of Classification Search
CPC ........... H04W 74/008; H04W 74/0833; H04W 28/0236
See application file for complete search history.

(56) References Cited

U.S. PATENT DOCUMENTS

| | | | | |
|---|---|---|---|---|
| 8,547,929 B1* | 10/2013 | Dinan | .................. | H04W 52/281 |
| | | | | 370/330 |
| 8,599,785 B1* | 12/2013 | Dinan | .................. | H04W 52/281 |
| | | | | 370/329 |
| 8,873,443 B2* | 10/2014 | Haim | .................. | H04W 52/146 |
| | | | | 370/311 |
| 8,958,342 B2* | 2/2015 | Dinan | .................. | H04W 52/18 |
| | | | | 370/252 |
| 8,964,593 B2* | 2/2015 | Dinan | .................. | H04W 52/34 |
| | | | | 370/252 |
| 9,137,762 B2* | 9/2015 | Ahn | .................. | H04W 52/146 |
| 9,241,326 B2* | 1/2016 | Dinan | .................. | H04W 52/34 |
| 9,319,194 B2* | 4/2016 | Dinan | .................. | H04L 5/0007 |
| 9,337,980 B2* | 5/2016 | Ahn | .................. | H04W 52/146 |
| 9,414,332 B2* | 8/2016 | Dinan | .................. | H04W 52/18 |
| 9,503,989 B2* | 11/2016 | Haim | .................. | H04W 52/146 |
| 9,648,643 B2* | 5/2017 | Dinan | .................. | H04W 52/281 |
| 9,743,431 B2* | 8/2017 | Dinan | .................. | H04W 74/085 |
| 9,749,926 B2* | 8/2017 | Muller | .................. | H04W 36/30 |
| 2012/0014333 A1* | 1/2012 | Ji | .................. | H04L 5/0032 |
| | | | | 370/329 |
| 2013/0044831 A1* | 2/2013 | Narasimha | .......... | H04W 52/346 |
| | | | | 375/260 |
| 2013/0058315 A1* | 3/2013 | Feuersanger | ....... | H04W 52/281 |
| | | | | 370/336 |
| 2013/0094466 A1* | 4/2013 | Kim | .................. | H04W 52/146 |
| | | | | 370/329 |
| 2013/0176953 A1 | 7/2013 | Stern-Berkowitz et al. | | |
| 2014/0226551 A1* | 8/2014 | Ouchi | .................. | H04W 52/04 |
| | | | | 370/311 |
| 2015/0271765 A1* | 9/2015 | Hakola | ............... | H04W 52/367 |
| | | | | 370/329 |
| 2016/0112971 A1* | 4/2016 | Dinan | .................. | H04W 52/34 |
| | | | | 370/329 |
| 2016/0302235 A1 | 10/2016 | Hwang et al. | | |

OTHER PUBLICATIONS

"Management of UE Transmit Power in Dual Connectivity", 3GPP TSG Ran WG2 Meeting #84, R2-134048, Nov. 11, 2013.
"Considerations on Power Control for Dual Connectivity," 3GPP TSG Ran WG2 Meeting #84, R2-134234, Nov. 11, 2013.
LG Electronics: "Discussion on random access in dual connectivity", 3GPP Draft; R1-140294, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Feb. 10, 2014-Feb. 14, 2014, Feb. 9, 2014, XP050735844.
Nokia et al: "Discussion on the LS on random access in dual connectivity", 3GPP Draft; R1-140560, 3rd Generation Partnership Project (3GPP), Mobile Competence Centre; 650; Route Des Lucioles; F-06921 Sophia-Antipolis Cedex; France, vol. RAN WG1, No. Prague, Czech Republic; Feb. 10, 2014-Feb. 14, 2014, Jan. 31, 2014, XP050751689.

* cited by examiner

RANDOM ACCESS METHOD AND APPARATUS FOR USE IN WIRELESS COMMUNICATION SYSTEM SUPPORTING DUAL CONNECTIVITY

CROSS-REFERENCE TO RELATED APPLICATION(S)

This application is a continuation application of prior application Ser. No. 14/661,459, filed on Mar. 18, 2015 and claims the benefit under 35 U.S.C. § 119(a) of a Korean patent application filed on Mar. 21, 2014 in the Korean Intellectual Property Office and assigned Serial number 10-2014-0033497, the entire disclosure of each of which is hereby incorporated by reference.

TECHNICAL FIELD

The present disclosure relates to a wireless communication system. More particularly, the present disclosure relates to a random access method and an apparatus for a terminal to perform random access procedure to multiple base stations in parallel in a Long Term Evolution (LTE) system supporting dual connectivity.

BACKGROUND

With the rapid advance of radio communication technology, the communication systems have highly evolved, and Long Term Evolution (LTE) system of the $3^{rd}$ Generation Partnership Project (3GPP) is one of the promising $4^{th}$ Generation (4G) mobile communication systems.

FIG. 1 is a diagram illustrating an architecture of an LTE system according to the related art.

Referring to FIG. 1, a radio access network of the LTE system includes evolved Node Bs (eNBs) 105, 110, 115, and 120, a Mobility Management Entity (MME) 125, and a Serving-Gateway (S-GW) 130. The User Equipment (hereinafter, referred to as a UE) 135 connects to an external network via the eNBs 105, 110, 115, and 120 and the S-GW 130.

Referring to FIG. 1, the eNBs 105, 110, 115, and 120 correspond to the legacy node Bs of the UMTS system. The eNBs 105, 110, 115, and 120 allow the UE 135 to establish a radio channel and are responsible for functions more complicated as compared to the legacy node B. In the LTE system, all the user traffic services including real time services, such as Voice over Internet Protocol (VoIP), are provided through a shared channel and thus there is a need of a device to schedule data based on the state information (such as buffer status, power headroom status, and channel condition of the UE), the eNBs 105, 110, 115, and 120 being responsible for such functions. Typically, one eNB controls a plurality of cells. In order to secure the data rate of up to 100 Mbps, the LTE system adopts Orthogonal Frequency Division Multiplexing (OFDM) as a radio access technology. In addition, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

FIG. 2 is a diagram illustrating a protocol stack of an LTE system according to the related art.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. In addition, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried by Physical Uplink Control Channel (PUCCH) or Physical Uplink Shared Channel (PUSCH).

Meanwhile, a new transmission scheme known as dual connectivity which is capable of allowing a UE to communicate multiple eNBs simultaneously is being developed as a part of LTE. A dual connectivity-capable UE may transmit data to and receive data from different eNBs simultaneously. For example, the dual connectivity-capable UE may connect to a macro eNB having a relatively large coverage area and a pico eNB having a relatively small coverage simultaneously. In this case, the UE can communicate with the pico eNB at a high data rate while, if its mobility is low, maintaining the mobility through connection with the macro eNB.

In order for the UE to communicate data with multiple eNBs simultaneously as described above, the UE has to perform the random access with respective eNBs. The random access procedure is performed to acquire uplink synchronization with the eNB for data transmission, and the UE incapable of the dual connectivity can perform the random access procedure with only one eNB. However, the UE capable of the dual connectivity may perform the random access procedure with multiple eNBs independently and thus there is a need of a random access method capable of allowing the UE to perform the random access procedure with two or more eNBs simultaneously based on the transmit power constrain of the UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a random access method and an apparatus that is capable of allowing a dual connectivity-enabled User Equipment (UE)

to perform the random access procedure with multiple evolved Node Bs (eNBs) in parallel in a mobile communication system.

The objects of the present disclosure are not limited to the aforesaid, and other objects not described herein with be clearly understood by those skilled in the art from the descriptions below.

In accordance with an aspect of the present disclosure, a communication method of a terminal capable of communicating with two base stations in parallel is provided. The communication method includes determining whether a first preamble transmission to a first cell of a first base station is overlapped with a second preamble transmission to a second cell of a second base station in a time domain, determining, when the first preamble transmission is overlapped with the second preamble transmission in the time domain, whether a sum of transmit powers calculated for the first and second preamble transmissions is greater than a maximum allowed transmit power of the terminal, and controlling, when the sum of the first and second preamble transmit powers is greater than the maximum allowed transmit power, the transmit power calculated for the second preamble transmission.

In accordance with another aspect of the present disclosure, a terminal capable of communicating with two base stations in parallel is provided. The terminal includes a transceiver configured to transmit and receive signals to and from a first and a second base stations and a controller configured to determine whether a first preamble transmission to a first cell of a first base station is overlapped with a second preamble transmission to a second cell of a second base station in a time domain, to determine, when the first preamble transmission is overlapped with the second preamble transmission in the time domain, whether a sum of transmit powers calculated for the first and second preamble transmissions is greater than a maximum allowed transmit power of the terminal, and to control, when the sum of the first and second preamble transmit powers is greater than the maximum allowed transmit power, the transmit power calculated for the second preamble transmission.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
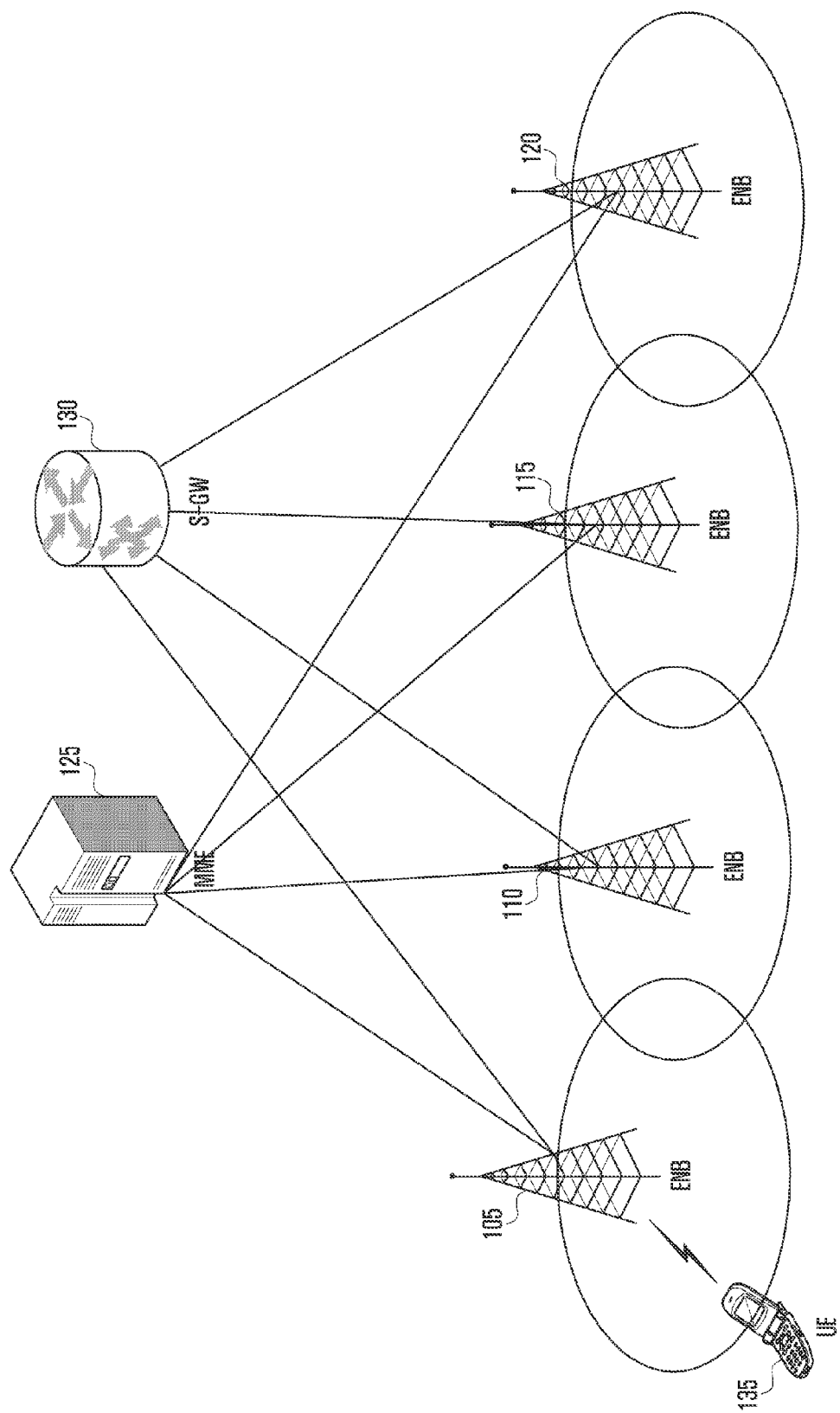
FIG. 1 is a diagram illustrating an architecture of a Long Term Evolution (LTE) system according to the related art.
Figure 2:
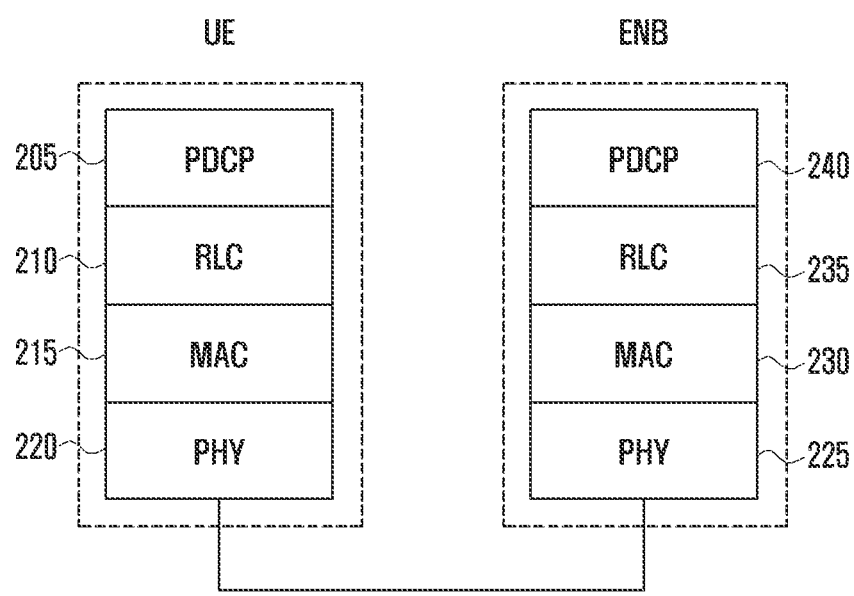
FIG. 2 is a diagram illustrating a protocol stack of an LTE system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure proposes the following methods to address the power shortage of the dual connectivity-enabled User Equipment (UE) which perform the random access procedure with multiple evolved Node Bs (eNBs).

Method 1: high priority preamble is transmitted first, and low priority preamble is transmitted with the power remained after transmission of the high priority preamble.

Priorities

Preamble transmitted to Primary Cell (i.e., a PCell of the Master eNB (one eNB may have multiple cells)).

Preamble transmitted to primary Secondary Cell (pSCell of Secondary eNB)

Preamble transmitted to rest Secondary Cells (SCells of the Master eNB or Secondary eNB).

According to an alternative embodiment of the present disclosure, it is possible to prevent the transmit power from increasing abruptly, when reaching the limit, by fixing the number of low priority transmissions.

Method 2: When transmissions are overlapped, skip the preamble with low priority.

Method 2-1: Suspend transmission during the overlap while updating transmit power equation continuously and then, when the overlap is resolved, resume transmission Method 2-2: Stop transmission since the transmission overlap Method 2-3: Suspend transmission during the overlap with a backoff of a certain time (without update of transmit power equation) and, when the backoff expires, resume the transmission.

Method 3: Transmit respective preambles of which transmit powers are adjusted in proportion to the maxim transmit power at the overlap time point.

A description is made of a solution for power shortage of the dual connectivity-enabled UE which is performing random access procedure with multiple eNBs.

Figure 3:
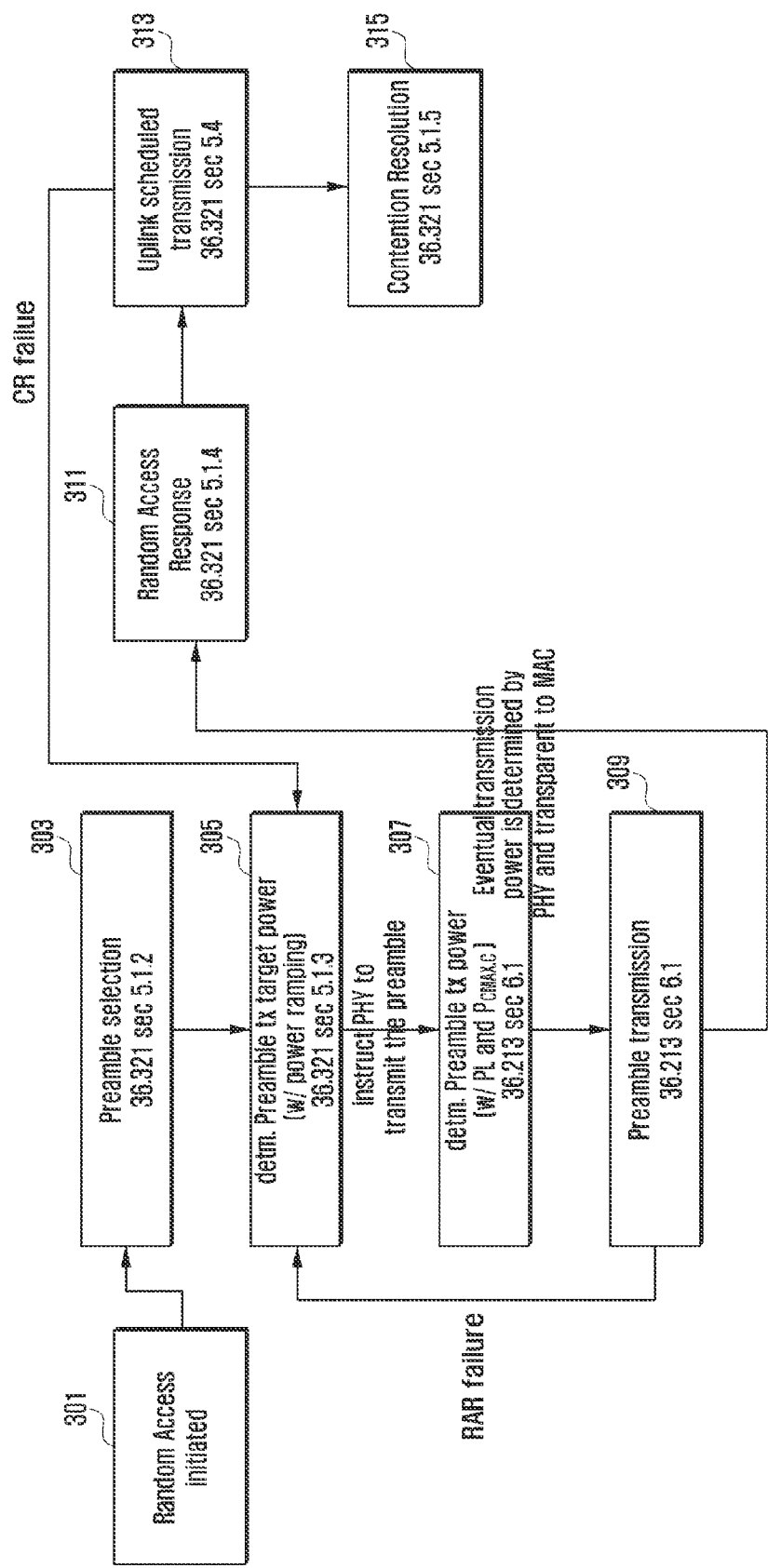
FIG. 3 is a flowchart illustrating a random access procedure in an LTE system according to an embodiment of the present disclosure.

FIG. 3 is a flowchart illustrating a random access procedure in a Long Term Evolution (LTE) system according to an embodiment of the present disclosure.

Referring to FIG. 3, the UE determines to perform a random access procedure at operation 301. For example, the UE may initiate the random access procedure for any reason of initial attachment attempt, uplink synchronization acquisition, and data transmission in the state of no resource required for resource request.

A Medium Access Control (MAC) layer selects one of the preambles allowed for use by the eNB among 64 preambles specified in the standard at operation 303. At this time, the eNB broadcasts a message carrying System Information Blocks (SIBs) to notify the UE located with the cell of the possible preambles.

Thereafter, the MAC layer of the UE determines the preamble transmit power (PREAMBLE_RECEIVED_TARGET_POWER) selected according to Equation (1) at operation 305.

PREAMBLE_RECEIVED_TARGET_POWER=preambleInitialReceivedTargetPower+DELTA_PREAMBLE+(PREAMBLE_TRANSMISSION_COUNTER−1)*powerRampingStep   Equation (1)

Here, the preambleInitialReceivedTargetPower denotes the initial preamble transmit power which the eNB has informed using SIB. The DELTA_PREAMBLE denotes a value determined according to the preamble format transmitted at the physical layer as shown in Table 1.

TABLE 1

| Preamble Format | DELTA_PREAMBLE value |
| --- | --- |
| 0 | 0 dB |
| 1 | 0 dB |
| 2 | −3 dB |
| 3 | −3 dB |
| 4 | 8 dB |

The PREAMBLE_TRANSMISSION_COUNTER denotes the number of preamble transmissions which are initialized to 1 and increments by 1 whenever the preamble is transmitted in the random access procedure. The preamble transmission stops when the parameter reach the maximum number of preamble transmission (preambleTransMax+1) configured by the eNB.

The powerRampingStep is a power ramping factor for retransmission after preamble transmission failure.

Once the UE fails to transmit the preamble, the UE increases the transmit power as much as powerRampingStep using Equation (1).

Thereafter, the physical layer of the UE determines the preamble transmit power ($P_{PRACH}$) based on the maximum UE output power using Equation (2) at operation 307. The UE transmits the preamble at the determined power level at operation 309.

$$P_{PRACH}=\min\{P_{CMAX,c}(i), \text{PREAMBLE\_RECEIVED\_TARGET\_POWER}+PL_c\} \text{ [dBm]} \qquad \text{Equation (2)}$$

At this time, $P_{CMAX,c}(i)$ denotes the maximum UE output power configured for cell c, and $PL_c$ denotes the pathloss estimated by the UE in cell c.

At operation 309, the UE transmits the preamble at the preamble transmit power ($P_{PRACH}$) determined at operation 307.

If a Random Access Response (RAR) is received from the eNB at operation 311, the UE performs operations 313 and 315. Otherwise, if no RAR is received in certain time, the UE perform operations 305 to 309 again to retransmit the preamble. As described above, the UE increases the transmit power as much as powerRampingStep at operation 305.

If the RAR is received successfully at operation 311, the UE transmits uplink data on the allocated resource at operation 313. If an acknowledgement is received successfully at operation 315, the UE ends the random access procedure. If the UE fails to receive the acknowledgement successfully, the UE may perform operations 305 to 313 again.

Figure 4:
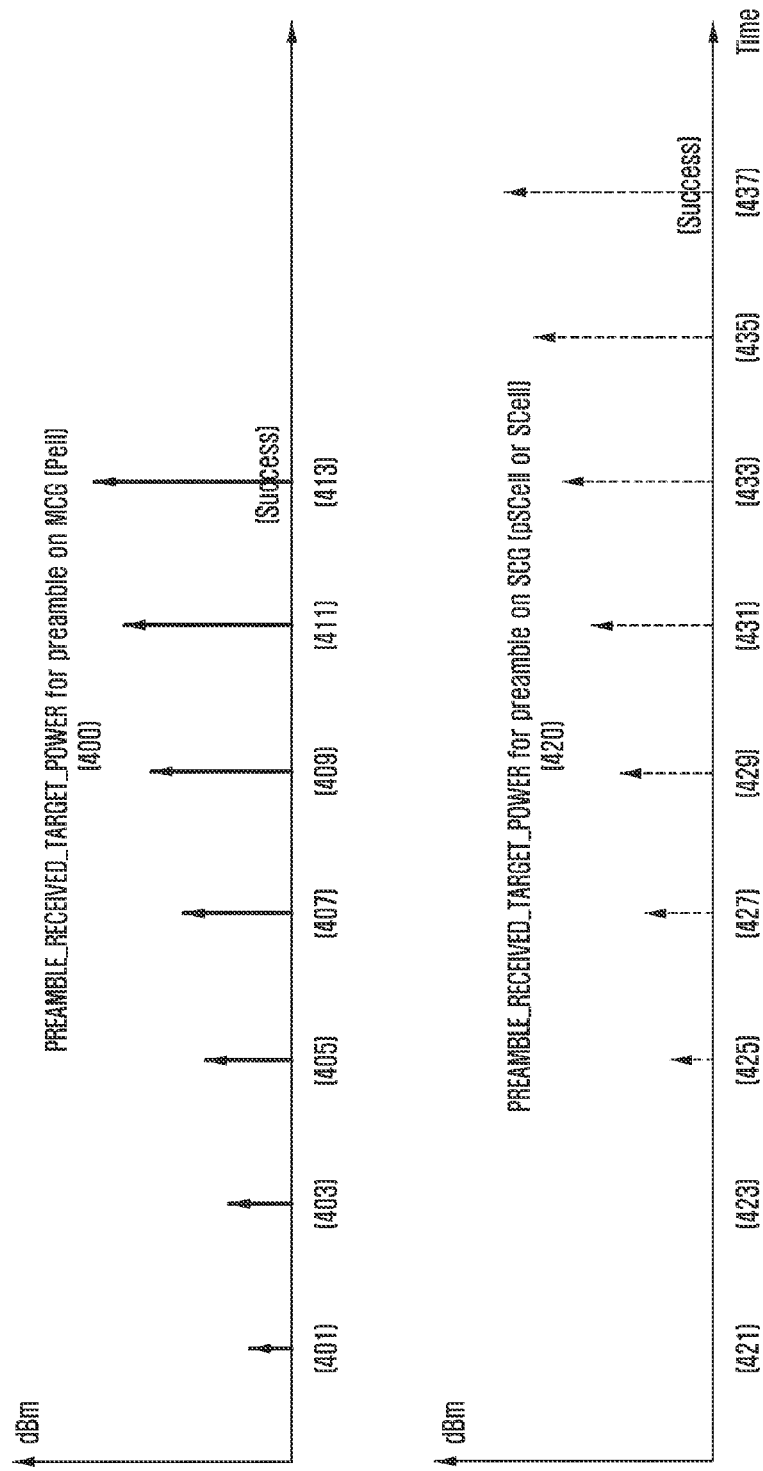
FIG. 4 is diagram illustrating per-cell preamble transmit power ramping mechanism in a random access procedure according to an embodiment of the present disclosure.

FIG. 4 is diagram illustrating per-cell preamble transmit power ramping mechanism in a random access procedure according to an embodiment of the present disclosure.

Referring to FIG. 4, a scenario in which the UE transmits preambles to a Master eNB (MeNB) or Master Cell Group (MCG) and a Slave eNB (SeNB) or Slave Cell Group (SCG) under the assumption of no total UE transmit power limit is illustrated.

The UE increases the transmit power ramps up stepwise at the transmission timings 401 to 413 until the MeNB-bound preamble transmission succeeds as shown in part 400. In addition, the UE transmits the preamble at the transmission timings 425 to 437 while increasing the transmit power until the preamble transmission succeeds.

In the case of applying the above procedure to the situation where the dual connectivity-enabled UE transmits preambles to multiple eNBs simultaneously, the preamble transmit powers for different eNBs increase simultaneously such that the total required transmit power is likely to exceed the configured maximum allowed transmit power ($P_{CMAX}$).

In such a situation, the current technology reduces the per-cell transmit powers equally. For example, the maximum UE output power is 100 and the per-cell required transmit powers of two cells are 100 respectively, the UE reduces both the per-cell required transmit powers to 50 for data transmission. In this case, however, the preambles transmitted to different eNBs may fail reaching target eNBs, resulting in random access failure in all the cells.

Figure 5:
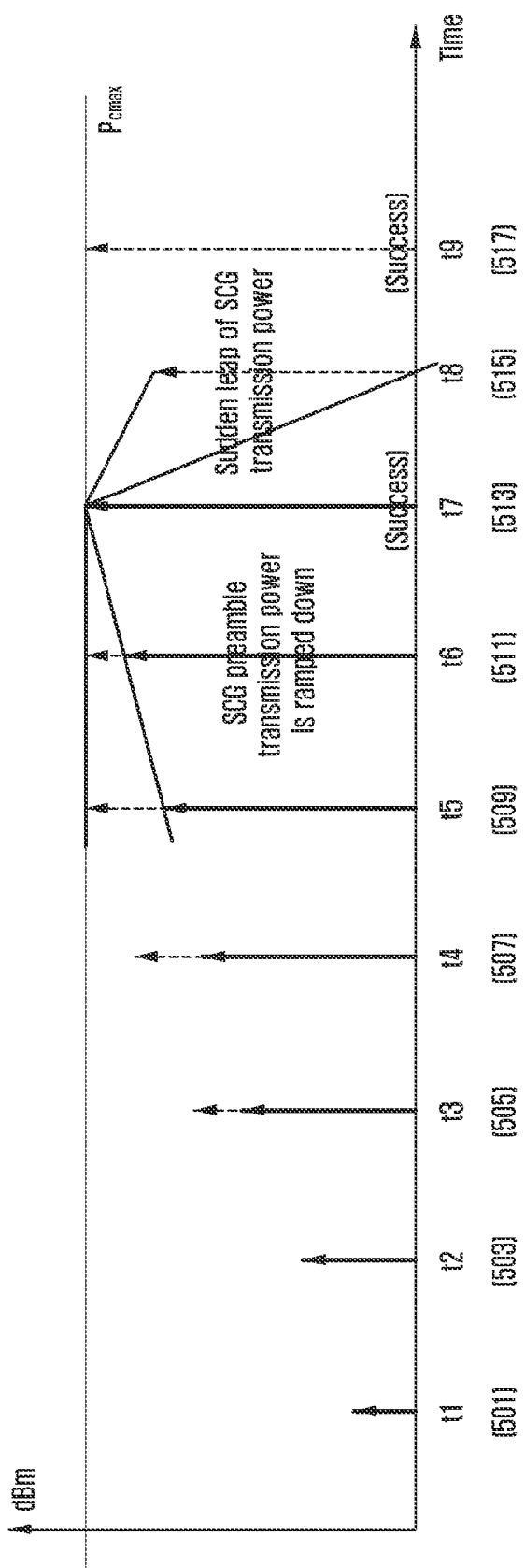
FIG. 5 is a diagram illustrating a preamble transmit power control in a random access method according to an embodiment of the present disclosure.

FIG. 5 is a diagram illustrating a preamble transmit power control in a random access method according to an embodiment of the present disclosure.

Referring to FIG. 5, it is assumed that the transmission occurs at the transmission timings as shown in FIG. 4 for explanation convenience. The UE transmits a MeNB-bound preamble at the timing t1 initially and retransmits the preamble repeatedly at a certain interval until the MeNB receives the preamble successfully. The UE also transmits a SeNB-bound preamble at the timing t3 initially and retransmits the preamble repeatedly at a certain interval until the SeNB receives the preamble successfully. Referring to FIG. 5, the solid line arrows denote the transmit power levels of the MeNB-bound preamble, and the dotted line arrows denote the transmit power levels of the SeNB-bound preamble.

Referring to FIG. 5, the UE transmits the MeNB-bound preamble at the timing t1 501. If no RAR is received from the MeNB in response to the preamble, the UE retransmits the preamble at the preamble transmit power which ramps up stepwise at the timings t2 to t7 according to the legacy preamble transmit power equation. According to an embodiment of the present disclosure, the preamble transmit power may be determined using Equations (1) and (2). At the timing t2 503, the UE may transmit the preamble at the transmit power ramped up to a certain extent compared to the transmit power at the timing t1 501 according to Equations (1) and (2). The UE also may start transmitting a SeNB-bound preamble at the timing t3 505. If no RAR is received from the SeNB in response to the preamble, the UE retransmits the preamble at the preamble transmit power ramped up to a certain extent according to the legacy preamble transmit power equation as denoted by reference number 507. In this way, the UE transmits the preambles to the MeNB and SeNB simultaneously from the timing t3 505.

The UE has to transmit the preambles to both the MeNB and SeNB still at timing t5 509. However, if the two preambles are transmitted at the preamble transmit powers calculated according to the legacy preamble transmit power equation, the total required transmit power exceeds the maximum allowed transmit power ($P_{CMAX}$). According to an embodiment of the present disclosure, the UE transmits the preamble having the high priority at the transmit power calculated according to the legacy preamble transmit power equation. For example, the UE transmits the preamble having the high priority at the preamble transmit power calculated according to Equations (1) and (2). Meanwhile, if the sum of the preamble transmit powers reaches the maximum allowed transmit power, the UE transmits the low priority preamble at the transmit power remained after transmitting the high priority preamble.

For example, the preambles may be prioritized as follows.

The preamble transmitted to the PCell of the master eNB (one eNB may have a plurality of cells) is allocated the highest priority.

The preamble transmitted to the pSCell of a Slave eNB is allocated with a priority lower than that of the preamble transmitted to the PCell.

The preamble transmitted to the rest secondary cells (secondary cells of the MeNB or other secondary cells of the SeNB) are allocated the lowest priority.

At this time, the UE may determine the transmit power of the preambles to be transmitted to the respective cells using Equations (3) to (5) at timings t5 509, t6 511, and t7 513.

$$P_{PRACH,PCell} = \min\{P_{CMAX,c}(i), \text{PREAMBLE\_RECEIVED\_TARGET\_POWER} + PL_c\} \text{ [dBm]} \quad \text{Equation (3)}$$

$$P_{PRACH,pSCell} = \min\{P_{CMAX,c}(i), \text{PREAMBLE\_RECEIVED\_TARGET\_POWER} + PL_c, P_{CMAX} - P_{PRACH,PCell}\} \text{ [dBm]} \quad \text{Equation (4)}$$

$$P_{PRACH,SCell} = \min\{P_{CMAX,c}(i), \text{PREAMBLE\_RECEIVED\_TARGET\_POWER} + PL_c, P_{CMAX} - P_{PRACH,PCell} - P_{PRACH,pSCell}\} \text{ [dBm]} \quad \text{Equation (5)}$$

Here, $P_{PRACH,PCell}$ denotes the preamble transmit power to the PCell, $P_{PRACH,pSCell}$ denotes the preamble transmit power to the pSCell, and $P_{PRACH,SCell}$ denotes the preamble transmit power to an SCell.

In the case of using Equations (3) to (5), since there is no power headroom after the MeNB-bound preamble is transmitted at the timing t7 513, the UE cannot perform transmission to the other eNB. However, if the MeNB receives the preamble transmitted at the timing t7 513, the UE can determine the transmit power of the preamble to be transmitted to the SeNB independently of the transmit power of the preamble to be transmitted to the MeNB since the timing t8 515. For example, the UE can transmit the SeNB-bound preamble at the power which ramps up normally according to the legacy preamble transmit power equation since the timing t8 515. For example, the UE can transmit the SeNB-bound preamble at the transmit power level identical with the power level ramped up at the timing 435 in FIG. 4. Afterward, the SeNB-bound preamble is transmitted successfully at the timing t9 517.

In the case of updating the transmit power using the legacy equation, the preamble transmit power to the SeNB increases abruptly at the timings t8 515 and t9 517. In order to address the issue, it can be considered to not increase the number of preamble transmissions of the UE (PREAMBLE_TRANSMISSION_COUNTER) when the transmit power reaches the maximum allowed transmit power at the timing t5 509. In this way, it is possible to prevent the preamble transmit power to the SeNB with the low priority from increasing abruptly after the high priority preamble transmission has succeeded.

Figure 6:
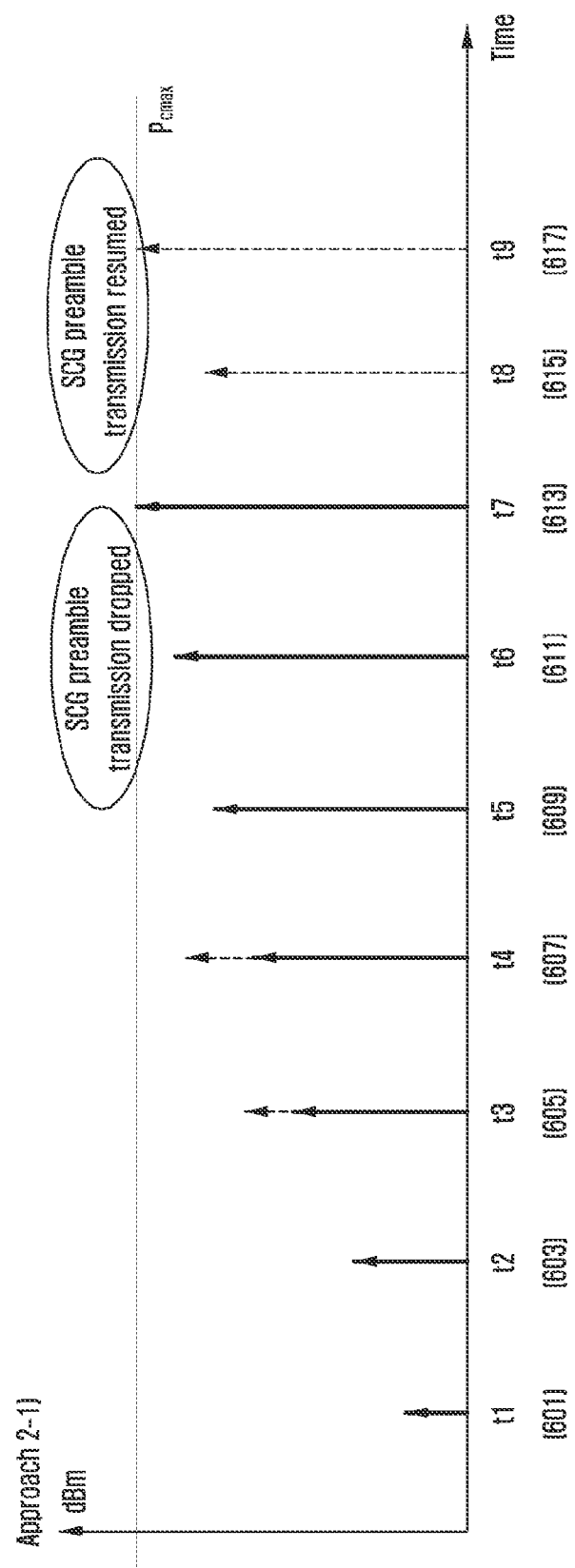
FIG. 6 is a diagram illustrating a preamble transmit power control in a random access method according to an embodiment of the present disclosure.

FIG. 6 is a diagram illustrating a preamble transmit power control in a random access method according to an embodiment of the present disclosure.

Referring to FIG. 6, it is assumed that the transmission occurs at the transmission timings as shown in FIG. 4 for explanation convenience. The UE transmits a MeNB-bound preamble at the timing t1 initially and retransmits the preamble repeatedly at a certain interval until the MeNB receives the preamble successfully. The UE also transmits a SeNB-bound preamble at the timing t3 initially and retransmits the preamble repeatedly at a certain interval until the SeNB receives the preamble successfully.

Referring to FIG. 6, the solid line arrows denote the transmit power levels of the MeNB-bound preamble, and the dotted line arrows denote the transmit power levels of the SeNB-bound preamble.

Referring to FIG. 6, the UE transmits a MeNB-bound preamble at the timing t1 601. If the UE fails to receive an RAR from the MeNB in response to the preamble, the UE retransmits the preamble at the preamble transmit power which ramps up stepwise at the timings t2 to t7 according to the legacy preamble transmit power equation. According to an embodiment of the present disclosure, the preamble transmit power may be determined using Equations (1) and (2). At the timing t2 603, the UE may transmit the preamble at the transmit power ramped up to a certain extent compared to the transmit power at the timing t1 601 according to Equations (1) and (2). The UE also may start transmitting a SeNB-bound preamble at the timing t3 605. If no RAR is received from the SeNB in response to the preamble, the UE retransmits the preamble at the preamble transmit power ramped up to predetermined extent according to the legacy preamble transmit power equation as denoted by reference number 607. In this way, the UE transmits the preambles to the MeNB and SeNB simultaneously from the timing t3 605.

The UE has to transmit the preambles to both the MeNB and SeNB still at timing t5 609. However, if the two preambles are transmitted at the preamble transmit powers calculated according to the legacy preamble transmit power equation, the total required transmit power exceeds the maximum allowed transmit power ($P_{CMAX}$). According to an embodiment of the present disclosure, the UE transmits the preamble having the high priority at the transmit power calculated according to the legacy preamble transmit power equation. For example, the UE transmits the preamble having the high priority at the preamble transmit power calculated according to Equations (1) and (2). Meanwhile, if the sum of the preamble transmit powers reaches the maximum allowed transmit power, the UE suspends transmitting the preamble with the low priority while updating the legacy preamble transmit power equation continuously. For example, if the sum of the required preamble transmit powers exceeds the maximum allowed transmit power ($P_{CMAX}$) at the timing t5 609, the UE transmits the MeNB-bound preamble with the high priority at the preamble transmit power calculated using the legacy preamble transmit power equation. Meanwhile, the UE skips transmitting the SeNB-bound preamble with the low priority at the timing t5 609 and at the timing t6 611. At this time, the UE may update the value of PREAMBLE_TRANSMISSION_COUNTER or powerRampingStep in Equation (1) for calculating the SeNB-bound preamble transmit power with the low priority.

Afterward, if the MeNB-bound preamble with the high priority is transmitted successfully at the timing t3 613, the UE transmits the SeNB-bound preamble with the low priority at the transmit power calculated using the updated equation at the timings t8 615 and t9 617.

Figure 7:
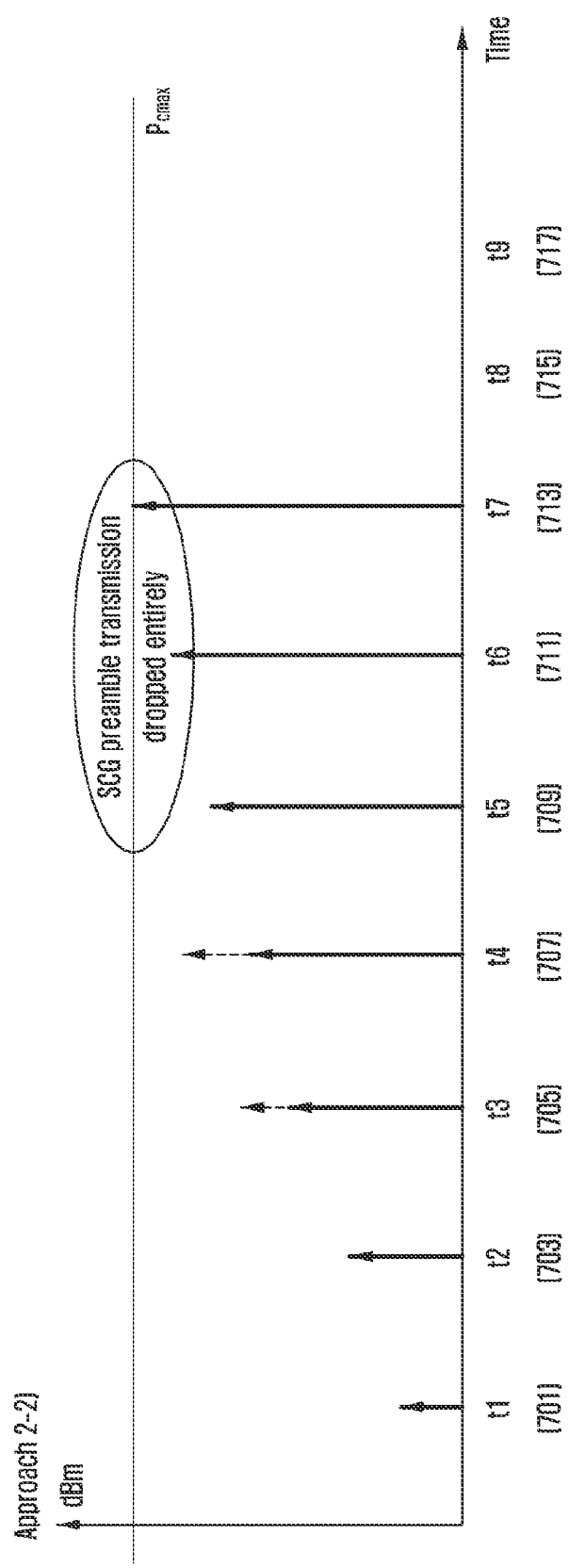
FIG. 7 is a diagram illustrating a preamble transmit power control in a random access method according to an embodiment of the present disclosure.

FIG. 7 is a diagram illustrating a preamble transmit power control in a random access method according to an embodiment of the present disclosure.

Referring to FIG. 7, the timings t1 701 to t9 717 are similar to the timings t1 601 to t9 617 of FIG. 6 and the UE transmits the preamble with the high priority first at the preamble transmit power calculated using the legacy preamble transmit power equation.

However, when the sum of the required preamble transmit powers reaches the maximum allowed transmit power, the UE may skip transmitting the preamble with the low priority at the timing t5 709.

Figure 8:
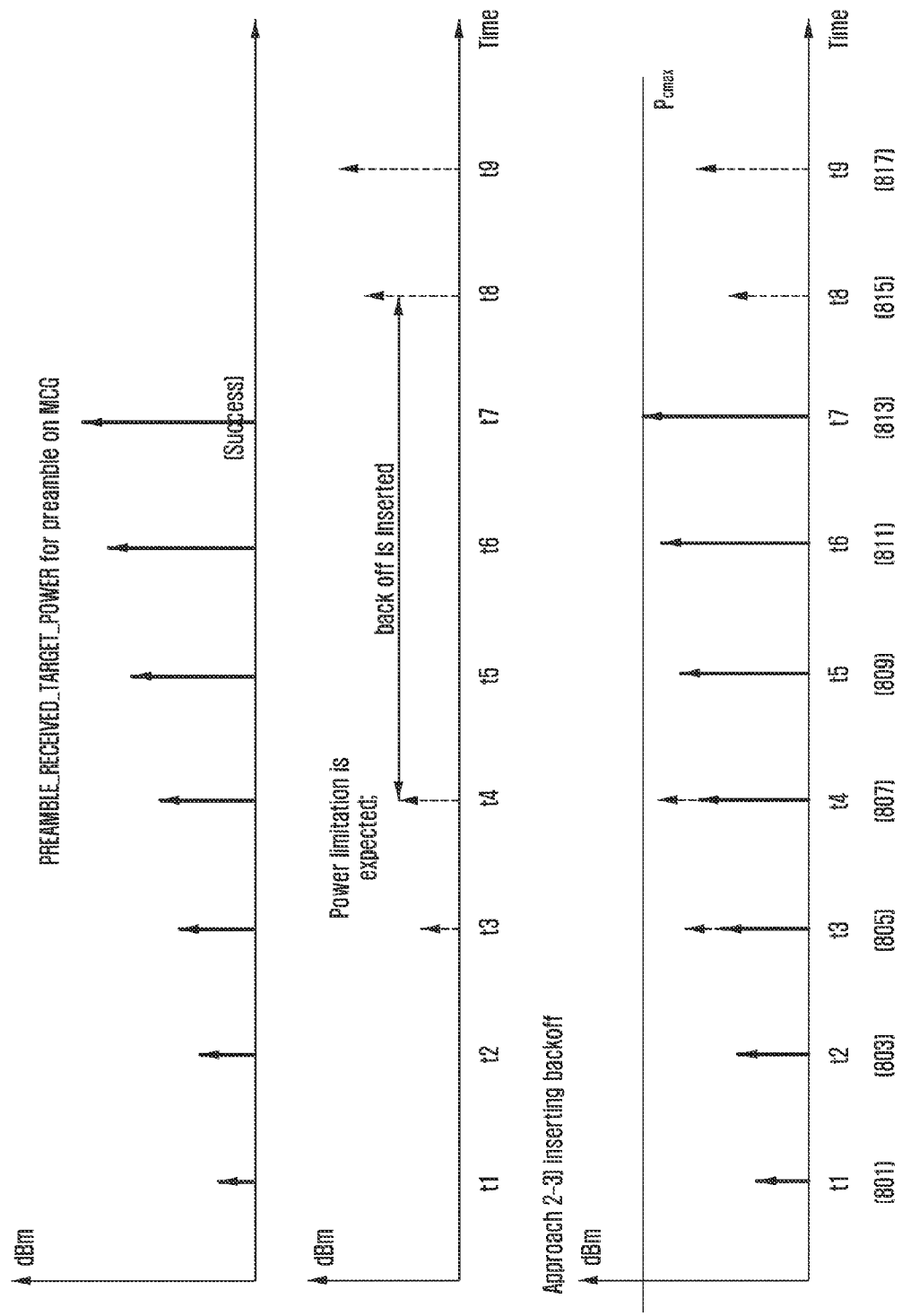
FIG. 8 is a diagram illustrating a preamble transmit power control in a random access method according to an embodiment of the present disclosure.

FIG. 8 is a diagram illustrating a preamble transmit power control in a random access method according to an embodiment of the present disclosure.

Referring to FIG. 8, the timings t1 801 to t9 817 are similar to the timings t1 601 to t9 617 of FIG. 6 and the UE transmits the preamble with the high priority first at the preamble transmit power calculated using the legacy preamble transmit power equation.

However, when the sum of the required preamble transmit powers reaches the maximum allowed transmit power, the UE does not update the legacy preamble transmit power equation for the low priority preamble until the high priority preamble is transmitted successfully. Depending on the embodiment of the present disclosure, the low priority preamble transmit power equation update may not be made from the timing t5 809 when the sum of the required preamble transmit powers reaches the maximum allowed transmit power of the UE to the timing t7 813 when the high priority preamble is transmitted successfully. After a certain time elapses or the high priority preamble is transmitted successfully, the UE resumes the update of the low priority preamble transmit power equation to retransmit the low priority preamble at the timings t8 815 and t9 817.

Figure 9:
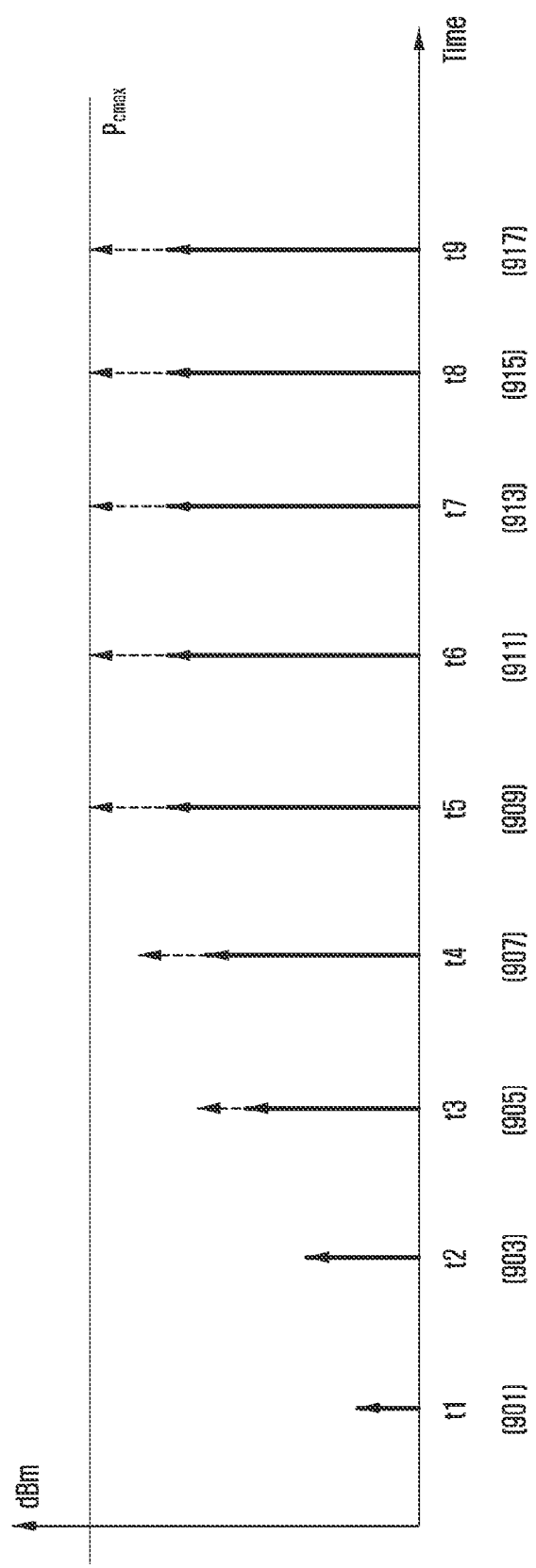
FIG. 9 is a diagram illustrating a preamble transmit power control in a random access method according to an embodiment of the present disclosure.

FIG. 9 is a diagram illustrating a preamble transmit power control in a random access method according to an embodiment of the present disclosure.

Referring to FIG. 9, a method of reusing the legacy method as far as possible is proposed. The timings t1 801 to t9 817 are similar to the timings t1 601 to t9 617 of FIG. 6. If the required transmit power reaches the maximum allowed transmit power, the UE reduces the per-cell transmit powers equally in ratio. The required transmit power reaches the maximum allowed transmit power at the timing t5 909 in FIG. 9. Afterward, if none of the preambles are transmitted successfully at the timings t6 911 to t9 917, the transmit powers of the respective preambles are reduced equally in ratio. Assuming that the maximum allowed transmit power is 100 and the per-cell required transmit powers are 80 and 120 respectively, the UE reduces the per-cell transmit powers equally in ratio to 40 and 60 so as to transmit the data at the maximum allowed transmit power level.

Figure 10:
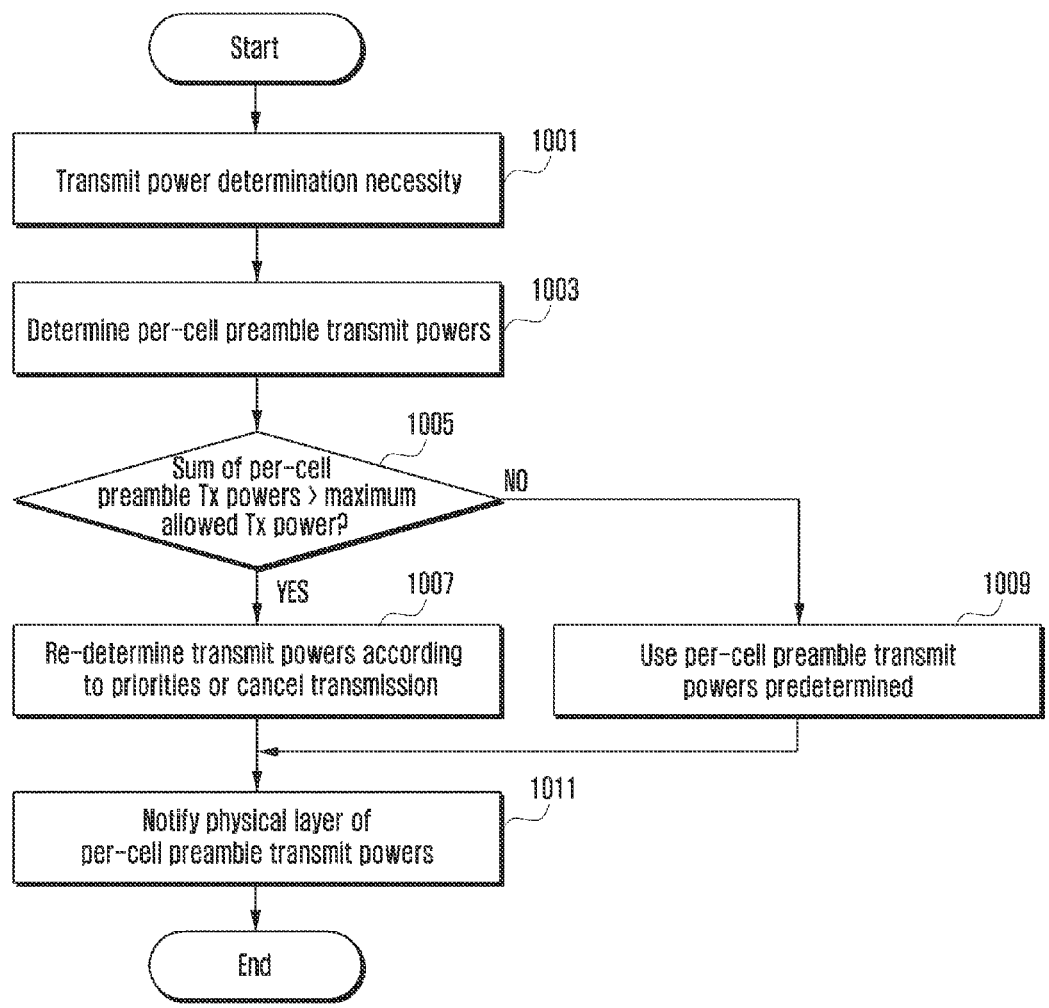
FIG. 10 is a flowchart illustrating the User Equipment (UE)-side procedure of a preamble transmit power control method according to an embodiment of the present disclosure.

FIG. 10 is a flowchart illustrating a UE-side procedure of a preamble transmit power control method according to an embodiment of the present disclosure.

Referring to FIG. 10, the UE detects the necessity of determining the preamble transmit power at operation 1001 (see operation 305 of FIG. 3). Then the UE determines per-cell preamble transmit powers using the legacy equation at operation 1003.

Thereafter, the UE determines the sum of the required per-cell preamble transmit powers is greater than the maximum allowed transmit power at operation 1005. If the sum of the required per-cell preamble transmit powers is not greater than the maximum allowed transmit power, the UE sets the final per-cell preamble transmit powers to the required per-cell preamble transmit powers (calculated at operation 1003) at operation 1009. Then the UE notifies the physical layer of the final per-cell preamble transmit powers at operation 1011.

Otherwise, if the sum of the required per-cell preamble transmit powers is greater than the maximum allowed transmit power at operation 1005, the UE adjusts the per-cell preamble transmit powers or suspends or cancels the low priority preamble transmission according to one of the various embodiments of FIGS. 4 to 9 at operation 1007.

According to an embodiment of the present disclosure, the preambles may be sorted by priority at operation 1007 such that the UE transmits the highest priority preamble first. In this embodiment of the present disclosure, the low priority preamble is transmitted using the transmit power remained after transmitting the high priority preamble. At this time, the priorities of the preambles are allocated in the order of PCell, pSCell, and SCell. Depending on the embodiment of the present disclosure, if the sum of the required per-cell preamble transmit powers reaches the maximum allowed transmit power, the UE may do not increase the number of low priority preamble transmissions (e.g., PREAMBLE_TRANSMISSION_COUNTER) to prevent the transmit power from increasing abruptly.

According to another embodiment of the present disclosure, if the sum of the required per-cell preamble transmit powers reaches the maximum allowed transmit power and thus it is impossible to transmit the preambles with the legacy equation, the UE may suspend or cancel the transmission of the low priority preamble.

According to another embodiment of the present disclosure, if the sum of the required per-cell preamble transmit powers reaches the maximum allowed transmit power, the UE may suspend the transmission of the low priority preamble. In this case, however, the UE may updates the low priority preamble transmit power although the low priority preamble is not transmitted. If the high priority preamble is transmitted successfully and thus the low priority preamble transmit power is secured, the UE transmits the low priority preamble at the updated low priority preamble transmit power.

According to another embodiment of the present disclosure, if the sum of the required per-cell preamble transmit powers reaches the maximum allowed transmit power, the UE may cancel the transmission of the low priority preamble.

According to another embodiment of the present disclosure, if the sum of the required per-cell preamble transmit powers reaches the maximum allowed transmit power, the UE may suspend the transmission of the low priority preamble. In this case, the UE may neither transmit the low priority preamble nor update the low priority preamble transmit power. Afterward, if the high priority preamble is transmitted successfully and thus the low priority preamble transmit power is secured, the UE updates the low priority preamble transmit power to transmit the low priority preamble.

According to another embodiment of the present disclosure, if the sum of the required per-cell preamble transmit powers reaches the maximum allowed transmit power, the UE may adjust the currently calculated per-cell preamble transmit powers equally in ratio to the maximum allowed transmit power. For example, if the maximum allowed transmit power is 100 and the per-cell required transmit powers are 80 and 120 respectively, the UE may reduce the per-cell transmit powers equally in ratio to 40 and 60 so as to transmit the data at the maximum allowed transmit power level.

The UE determines to adjust the preamble transmit power or stop the preamble transmission at operation 1007 and then notifies the physical layer of the determination result at operation 1011.

Figure 11:
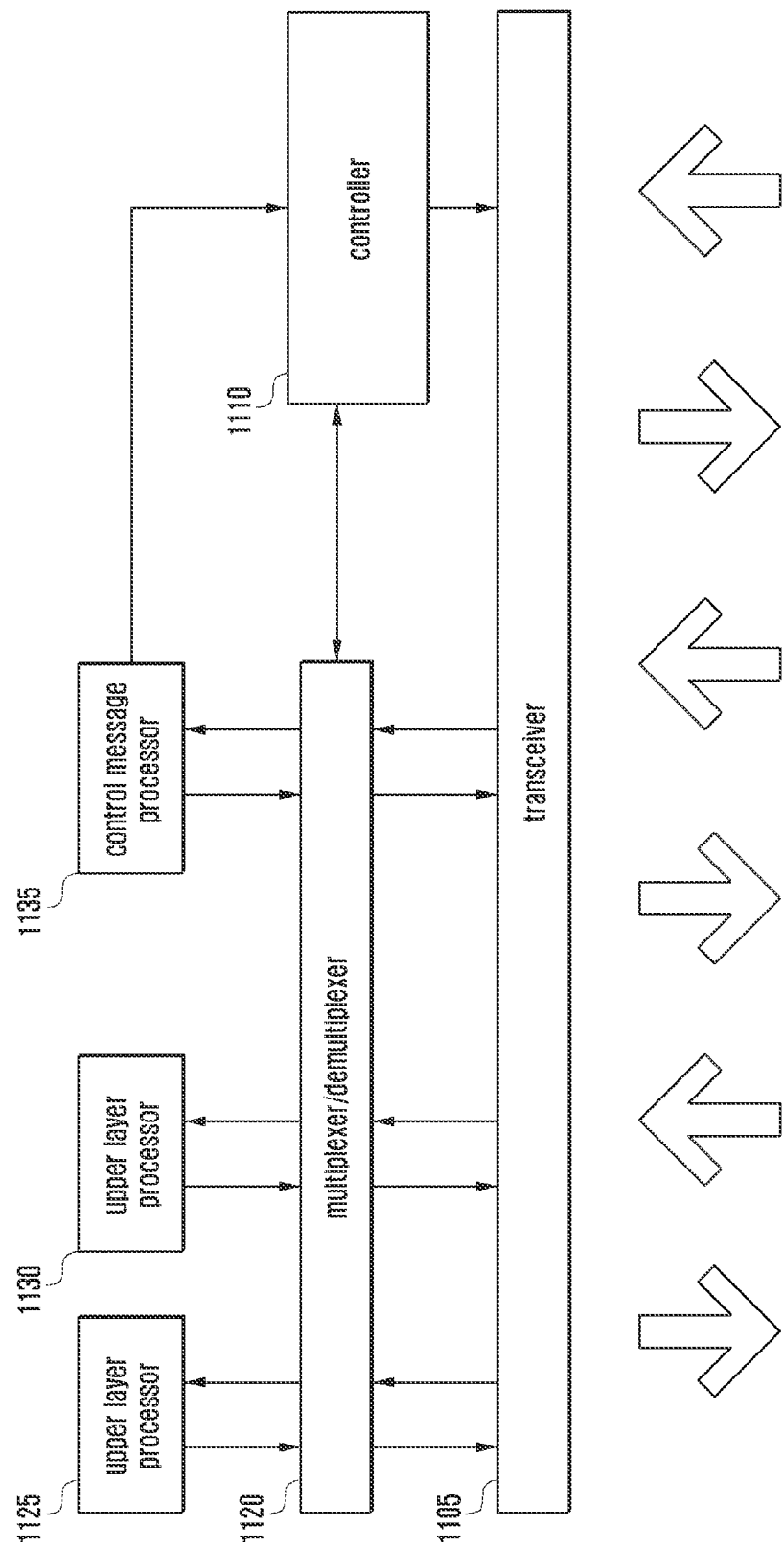
FIG. 11 is a block diagram illustrating a configuration a UE according to an embodiment of the present disclosure.

FIG. 11 is a block diagram illustrating a configuration the UE according to an embodiment of the present disclosure.

Referring to FIG. 11, the UE according to an embodiment of the present disclosure includes a transceiver 1105, a controller 1110, a multiplexer/demultiplexer 1120, a control message processor 1135, and upper layer processor 1125 and 1130.

The transceiver 1105 is responsible for receiving data and control signal through a downlink channel of the serving cell and transmitting data and control signals through an uplink channel. In the case that a plurality of serving cells is configured, the transceiver 1105 transmits and receives data and control signals through the plural serving cells.

The multiplexer/demultiplexer 1115 is responsible for multiplexing data generated by the upper layer processors 1120 and 1125 and the control message processor 1135 or demultiplexing data received by the transceiver 1105 to deliver the demultiplexed data to the upper layer processors 1125 and 1130 and the control message processor 1035.

The control message processor 1135 processes the control message received from the eNB and takes a certain action.

The upper layer processor 1125 and 1130 is established per service. The upper layer processors 1125 and 1130 process the data generated in the user service, such as a File Transfer Protocol (FPT) and a Voice over Internet Protocol (VoIP), and transfers the processed data to the multiplexer/demultiplexer 1120 or processes the data from the multiplexer/demultiplexer 1120 and delivers the processed data to the upper layer service applications.

The controller 1110 controls overall operations of the UE according to an embodiment of the present disclosure. The controller 1110 controls the UE to perform the operations of one of the above described embodiments. For example, the controller 1110 may control the transceiver 1105 and the multiplexer/demultiplexer 1120 to perform uplink transmission on the appropriate resource at an appropriate timing based on the scheduling command, e.g., an uplink grant, received by the transceiver 1105.

In an embodiment of the present disclosure, if preamble transmission is required, the controller 1110 determines whether the sum of the required per-cell preamble transmit powers is greater than the maximum allowed transmit power of the UE and, if so, adjust the low priority preamble transmit power or suspend transmitting the low priority preamble as proposed in one of the above described embodiments of the present disclosure, thereby transmitting preambles efficiently.

Figure 12:
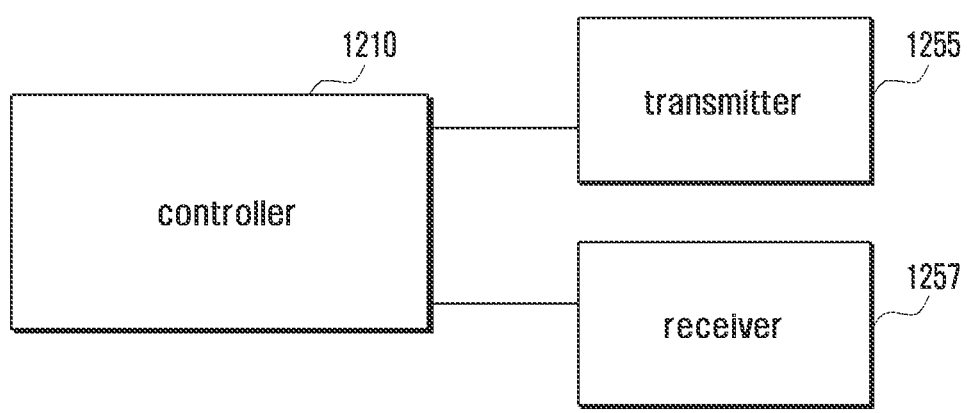
FIG. 12 is a schematic block diagram illustrating a configuration of an eNB according to an embodiment of the present disclosure.

FIG. 12 is a schematic block diagram illustrating a configuration of the eNB according to an embodiment of the present disclosure.

Referring to FIG. 12, the eNB according to an embodiment of the present disclosure includes a communication unit and a controller 1210 controlling overall operations of the eNB.

The controller 1210 controls the eNB to perform at least one of the operations described in the above embodiments. For example, the controller 1210 controls to receive the preamble transmitted at the power adjusted by the UE and to transmit a Random Access Response (RAR) message in response to the received preamble.

The communication unit transmits/receives signals according to the operation of one of the above described embodiments. The communication unit includes a transmitter 1255 and a receiver 1257. The communication unit may receive the preamble transmitted by the UE. The communication unit may transmit the random access response message in response to the preamble under the control of the controller 1210.

As described above, the random access method and an apparatus of a dual connectivity-enabled UE is advantageous in terms of performing the random access procedure with multiple eNBs efficiently so as to guarantee communication reliability in a mobile communication system.

As described above, the random access method and an apparatus of the present disclosure is advantageous in that a dual connectivity-enabled UE is capable of transmitting the preamble, even when the preamble transmit power cannot be increased due to the transmit power limit, so as to guarantee stable communication.

The advantages of the present disclosure are not limited to the aforesaid, and other advantages not described herein be clearly understood by those skilled in the art from the descriptions below.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal communicating with a master base station and a secondary base station, the method comprising:
    identifying that a transmission of a first preamble on a primary cell of the master base station is overlapped with a transmission of a second preamble on a secondary cell of the secondary base station in a time domain and a sum of transmission powers determined for the transmissions of the first preamble and the second preamble is greater than a maximum allowed transmission power of the terminal;
    transmitting the first preamble on the primary cell based on the transmission power determined for the transmission of the first preamble;
    adjusting the transmission power determined for the transmission of the second preamble;
    transmitting the second preamble on the secondary cell based on the adjusted transmission power; and
    if no random access response is received within a predetermined period, skipping an increase of a number of transmission of the second preamble and retransmitting the second preamble at a transmission power determined based on the number of transmission of the second preamble.

2. The method of claim 1, wherein the transmitting of the first preamble on the primary cell comprises maintaining the transmission power determined for the transmission of the first preamble.

3. The method of claim 1, wherein transmitting of the second preamble comprises adjusting the transmission power of the second preamble to maintain the sum of the transmission powers below the maximum allowed transmit power.

4. The method of claim 1, wherein the transmission power determined based on the number of transmission of the second preamble is calculated based on an equation:

PREAMBLE_RECEIVED_TARGET_POWER= preambleInitialReceivedTargetPower+DELTA_PREAMBLE+(PREAMBLE_TRANSMISSION_COUNTER−1)*powerRampingStep, wherein the PREAMBLE_RECEIVED_TARGET_POWER is the preamble transmission power, the preambleInitialReceivedTargetPower is an initial preamble transmission power, the DELTA_PREAMBLE is a value determined according to a preamble format transmitted at a physical layer, PREAMBLE_TRANSMISSION_COUNTER is a value indicating the number of transmission, and powerRampingStep is a power ramping factor for retransmission after preamble transmission failure.

5. A terminal communicating with a master base station and a secondary base station, the terminal comprising:
    a transceiver configured to transmit and receive signals to and from the master base station and the secondary base station; and
    at least one processor configured to:
        identify that a transmission of a first preamble on a primary cell of the master base station is overlapped with a transmission of a second preamble on a secondary cell of the secondary base station in a time domain and a sum of transmission powers determined for the transmissions of the first preamble and the second preamble is greater than a maximum allowed transmission power of the terminal,
        control the transceiver to transmit the first preamble on the primary cell based on the transmission power determined for the transmission of the first preamble,
        adjust the transmission power determined for the transmission of the second preamble,
        control the transceiver to transmit the second preamble on the secondary cell based on the adjusted transmission power, and
        if no random access response is received within a predetermined period, skip an increase of a number of transmission of the second preamble and control the transceiver to retransmit the second preamble at a transmission power determined based on the number of transmission of the second preamble.

6. The terminal of claim 5, wherein the at least one processor is further configured to maintain the transmission power determined for the transmission of the first preamble.

7. The terminal of claim 5, wherein the at least one processor is further configured to adjust the transmission power of the second preamble to maintain the sum of the transmission powers below the maximum allowed transmit power.

8. The terminal of claim 5, wherein the transmission power determined based on the number of transmission of the second preamble is calculated based on an equation:

PREAMBLE_RECEIVED_TARGET_POWER= preambleInitialReceivedTargetPower+DELTA_PREAMBLE+(PREAMBLE_TRANSMISSION_COUNTER−1)*powerRampingStep, wherein the PREAMBLE_RECEIVED_TARGET_POWER is the preamble transmission power, the preambleInitialReceivedTargetPower is an initial preamble transmission power, the DELTA_PREAMBLE is a value determined according to a preamble format transmitted at a physical layer, PREAMBLE_TRANSMISSION_COUNTER is a value indicating the number of transmission, and powerRampingStep is a power ramping factor for retransmission after preamble transmission failure.

* * * * *